Patented Aug. 18, 1931

1,819,314

UNITED STATES PATENT OFFICE

PAUL ZURCHER, OF FLORENCE, COLORADO, ASSIGNOR, BY MESNE ASSIGNMENTS, TO CONTINENTAL OIL COMPANY, OF PONCA CITY, OKLAHOMA, A CORPORATION OF DELAWARE

ACTIVATED CARBON

No Drawing.   Application filed August 13, 1928.   Serial No. 299,442.

The present invention relates generally to the formation of activated carbon, and particularly to the formation of hard granulated activated carbon, and to the use of coke, such as petroleum residues, as a raw material.

Carbons in powder form are not suited for certain purposes, such as rapid filtration, gas adsorption and refining in vapor phase; therefore they must be used in granular form. The grains must be able to withstand shock, crushing, pressure and friction. Carbons may be prepared from fruit pits, coconut shells and the like which are relatively hard and granular, and these carbons are very desirable because they are capable of withstanding such forces.

Petroleum coke is not well suited for the production of high grade active carbon by any of the prior known processes, and use of it in this direction has been neglected. At best it yields a soft or powdered carbon.

In producing activated carbons the general practice has been to eliminate hyrdocarbons and organic matter from the raw material by slow decomposition or carbonization at low temperatures prior to activation of the carbon. This practice is based upon the general belief that carbon deposited at low temperatures tends to be active, while carbon deposited at higher temperatures tends to be graphitic in character and inactive. Some authorities have set the dividing limit at about 600° C.

I have found that petroleum coke can be made to form a hard carbon by specifically different processes, and that I can proceed in total disregard of the general practice above mentioned as to the elimination of hydrocarbons. In my copending application Ser. No. 299,441 filed August 13, 1928, I have described a phosphoric acid process that is generally applicable to activate all carbons, including petroleum coke. The process of that application can be employed in the present invention, but the present invention is not limited to such process as will appear hereinafter.

The primary object of the present invention is the formation of a hard granulated active carbon.

A particular object is the use of petroleum coke as a raw material for the formation of a suitable activated carbon.

A further object of the invention is the provision of a hardening process for soft activated carbons.

Still another object of the invention is the provision of a direct process for the formation of a hard carbon from material which ordinarily forms soft carbon.

A special object is the activation of carbon containing excessive quantities of hydrocarbons.

A further and important object of the invention is the activation of carbon by the combined action of steam and sulphur products, such as may be formed from sulphur and steam, and the cleansing of carbon by the action of steam.

Various other objects and advantages of the invention will be apparent from the following explanation and illustrative examples of the invention showing various ways of carrying the invention into practice.

In my copending application Ser. No. 299,441 above referred to, I have described a process of treating carbon by the combined action of steam and activating acid substances, such as phosphoric acid and sulphuric acid, giving specific examples using phosphoric acid. In the present application I show examples using the resultant products of sulphur and steam, and have particularly pointed out one way to operate the process to produce a hard and granular product.

In general the invention comprises the use of raw material which is capable of yielding a soft carbon, so that when treated and activated it will yield instead of a soft carbon, a hard and granular product. As a specific example of the raw material which I may employ I give petroleum still residues, in the form of coke with or without a volatile content, or residues which are soft and plastic at higher temperatures. These materials may be used directly or may be admixed with heavy hydrocarbons and granulated to a predetermined size for treatment by the processes hereinafter more particularly described. In one embodiment of the invention I find that the added binder of hydrocarbon aids in producing a hard and granular form. In another embodiment I find that no binder is required, and that the nature of the process itself produces the hard form. I also find that the quality of the carbon product and the specific properties in particular directions are greatly altered by making changes in the processes, such as changes in the composition, the amount of added hydrocarbon, the temperature of treatment, the time of treatment, etc. Consequently, it is to be understood that various changes and modifications may be made in the processes hereinafter to be detailed, and in the compositions and time and temperatures therein given, without in any way departing from the spirit and scope of the invention as expressed in the appended claims.

*Example I.*—Using the process described in my co-pending application Ser. No. 299,441, I take 100 parts of petroleum coke containing about 12% volatile matter, and mix therewith a small percentage of binder, such as 15% of heavy hydrocarbon or residual oil, and 20% of phosphoric acid. The mixture is granulated by use of pressure sufficient to pass the soft mixture through a machine on the order of a meat chopper. The granulated particles of the desired size are passed into a rotary furnace toward a heating zone of about 950° C. Feeding and rotation are arranged to provide a furnace passage of about three hours. At the discharge end of the furnace I introduce low pressure steam (about 8 inches water pressure) in amount equal to about one third of the charge. According to the process, as described in the copending application, the steam and phosphoric acid act together in activating the carbon present in the charge. The steam also regenerates the reduced phosphorus products and cleanses the discharged carbon of phosphorus impurities.

The product amounts to about 55% of the coke employed. Its activity is expressed by the decolorization in 30 minutes at 85° C. of 900 cc. of standard methyl orange solution (containing 1 gram methyl orange in 5000 cc. of water). Its activity is also expressed by the adsorption of 12% of gasoline vapors at a temperature of melting ice and it will completely desulfurize hydrocarbons if they are passed through it in vapor phase at certain prevailing conditions. The product is therefore a good decolorizing carbon and a good refining agent for hydrocarbons in the vapor phase. It is a hard product and capable of withstanding mechanical shock. Hardness appears to be formed by the combined action of the steam and of the phosphoric acid.

It will be noted particularly that in the above described process a large quantity of hydrocarbon and of volatile material is present in the mass when the activating agent is mixed therewith, that a high temperature is employed in the process, and that a good product results without the necessity of slow low-temperature decomposition, and of elimination of hydrocarbon prior to the activation.

I find that the combined phosphoric acid and steam process is not the only process that will yield a hard granular carbon. I may take any soft activated carbon, such as one formed from petroleum coke, and subject it to special treatment to render it hard and specifically active to remove sulphur from hydrocarbon vapors. I have found that such soft carbons may be subjected to the action of hot hydrocarbon vapors containing sulphur impurities, so that some sulphur enters the carbon. The sulphur in vapor phase appears to harden the carbon. A subsequent steam treatment of the sulphur-laden carbon to remove sulphur yields the hardened activated product.

*Example II.*—A very soft carbon which disintegrates under slight pressure has been prepared by combining 100 parts of petroleum coke with 15% liquid hydrocarbon as a binder, granulating the mixture and activating the granulated product. It may be activated by the ordinary steam process in a rotary furnace, quantity of steam supplied, time and temperature of treatment depending on the final product desired. Any known activation process may be employed, and a soft carbon is the resultant product, as distinguished from the hard carbon which is obtained by my special phosphoric acid and steam process. The soft carbon is moved through a rotary furnace and subjected to a counter current of hydrocarbon vapors containing sulphur impurities. Kerosene vapors having about a 1% sulphur content have been employed at a furnace temperature of 450° C. for a period of about one hour. The carbon thus treated was subjected to the action of water vapor by introducing steam into the discharge end of the furnace at a temperature of 650° C. for about 1 hour, or until the sulphur content was removed from the carbon. At a temperature of 510° C. the steam is known to be active to remove sulphur and activate the carbon.

The product of the above process has been tested for hardness by placing a sufficient bulk of it in a container to half fill the same. The container was then rotated on its short axis at twelve complete revolutions per minute for two hours to subject the grains to mechanical friction and other forces. The composition expressed in percentage of grain sizes before and after the test was substantially the same; to wit:

| Grain size | Composition before test | Composition after test |
|---|---|---|
|  | Per cent | Per cent |
| +10 mesh | 26.4 | 26.7 |
| −10 mesh +20 mesh | 48.5 | 46.7 |
| −20 mesh −+40 mesh | 15.9 | 16.0 |
| −40 mesh +60 mesh | 4.3 | 4.8 |
| −60 mesh | 4.9 | 5.8 |

In the foregoing table +10 mesh means grains that will be held on a 10-mesh screen and the expression −10 mesh +20 mesh means grains that will pass through a 10-mesh screen but which will be held on a 20-mesh screen.

Although the processes of Examples I and II may appear at first blush to be widely divergent, there is a type of action common to them. In Example I activation is effected by phosphoric acid and steam, attended by a regenerative action of the steam on the reduced phosphorus compounds, such as phosphorus and the lower oxides of phosphorus, and accompanied by a cleansing action of the steam in removing volatile phosphorus products from the carbon. In Example II sulphur and steam are present at reactive temperatures, comparable to the presence of phosphorus and steam in Example I. According to the Urbain Patent No. 1,659,931 sulphuric acid and phosphoric acid are each useful as activating agents for carbon. But it appears that by using steam in combination with phosphoric or sulphuric compounds at reactive temperatures, a hardening and activating action is obtained. In Example II, therefore, the treatment of the carbon with sulphur-laden hydrocarbon vapor may be viewed as a step of introducing sulphur for subsequent action in combination with steam. Just as the incorporation of hydrocarbon with petroleum coke and phosphoric acid in Example I is helpful in forming a hard carbon, so might it be true that the presence of hydrocarbon and the sulphur together in this step have a conjoint and beneficial action in hardening the product.

The foregoing illustrates the preparation of hard and activated carbon from material normally yielding soft carbon. I have shown that a specific activation process is capable of yielding a hard carbon from raw material comprising petroleum coke, with or without added hydrocarbon. I have also shown that other activation processes on similar raw material do not yield a hard carbon, and that soft carbon may be rendered hard by a specific use as activated carbon, that is one to introduce sulphur in elemental or combined form into it, followed by a regeneration or treatment with steam at a reactive temperature.

The carbon prepared according to this invention is also capable of use like other activated carbons for absorbing and purifying processes, such as the absorption of gases and vapors of the saturated type of hydrocarbon, as in the methane series, which are constituents of natural gases; for unsaturated and other gases, such as those arising in refining operations, particularly those from pressure stills; for absorption of casing head gas; for toxic gases, like those encountered in industry and in warfare; for purification of gases like carbonic acid by a selective retention of impurities from the gas when the absorbed gas is removed from the carbon.

In my copending application Ser. No. 299,441, I have claimed generically the combined action of steam and acid materials such as phosphoric and sulphuric compounds and their reduction products, and specifically the combined action of steam and the phosphorus compounds. In this application I am claiming generically the combined action of steam and sulphur products, and specifically the introduction of sulphur into the charge by a special step, and specifically the use of petroleum coke. In the following claims where I use the term "sulphur" it is to be considered as present either in elemental or combined form and is not to be considered as limited to elemental sulphur unless so specified.

I claim:

1. The method of treating carbon which comprises subjecting the carbon to the combined activating action of steam and sulphur, and treating with steam until the sulphur products are removed.

2. The method of treating carbon which comprises subjecting carbon to the combined action of sulphur and steam at about 650° C., and removing sulphur products from the mass.

3. The method of treating carbon which comprises subjecting the carbon to the combined activating action of sulphur and steam, and removing sulphur products from the same.

4. The method of treating carbon which comprises introducing sulphur into the carbon, and thereafter activating the carbon with steam until the sulphur is removed.

5. The method of treating carbon which comprises introducing sulphur into the carbon by contact of the carbon with hydrocarbon vapors containing sulphur, and thereafter subjecting the sulphur-laden carbon to the activating action of steam.

6. The method of treating carbon which comprises introducing sulphur into the carbon by contact with hydrocarbon vapors containing sulphur at about 450° C., and thereafter subjecting the mass to the resulting reaction with steam at temperatures above 600° C.

7. The method of producing a hard granular activated carbon which comprises subjecting activated granules of a mixture of petroleum coke containing volatile matter and a hydrocarbon to the combined activating action of steam and sulphur products.

8. The method of producing a hard granular activated carbon which comprises subjecting an activated mixture of petroleum coke and heavy hydrocarbon to the combined activating action of steam and sulphur.

9. The method of producing a hard granular activated carbon which comprises subjecting activated granules of a mixture of petroleum coke and heavy hydrocarbon to the combined activating action of steam and sulphur products at a temperature above 500° C.

10. The method of producing a hard granular activated carbon which comprises subjecting activated granules of carbon to the action of sulphur-laden vapors of a hydrocarbon, and thereafter subjecting the sulphur bearing carbon to the activating action of steam.

11. The method of producing a hard granular activated carbon which comprises subjecting activated granules of carbon to sulphur-laden vapors of a hydrocarbon at a temperature of about 450° C., and thereafter activating the mass with steam until the sulphur is removed.

12. The method of producing a hard granular activated carbon which comprises subjecting granules of an activated carbon to the sulphur-laden vapors of a hydrocarbon at a temperature of about 450° C., and thereafter subjecting the mass to the action of steam above 500° C. until the sulphur is removed.

13. The method of producing a hard granular activated carbon which comprises treating a soft activated carbon with material containing sulphur whereby the active carbon adsorbs sulphur, and thereafter treating the sulphur laden carbon with steam at an activating temperature until the sulphur is removed.

14. The method of producing a hard granular activated carbon which comprises introducing sulphur into a soft activated carbon, and thereafter subjecting the carbon to activation with a current of steam until the sulphur and its reaction products with steam are removed from the carbon.

15. The method of producing a hard granular activated carbon which comprises activating petroleum still residues, subjecting the activated residues to hydrocarbon vapors containing sulphur impurities, and removing adsorbed sulphur from the carbon by the action of steam.

16. The method of producing a hard granular activated carbon which comprises activating a mixture of petroleum still residues and heavy hydrocarbon, subjecting the activated product to hydrocarbon vapors containing sulphur, and removing adsorbed sulphur from the carbon by the action of steam.

PAUL ZURCHER.